(12) United States Patent
Andersson et al.

(10) Patent No.: US 8,724,280 B2
(45) Date of Patent: May 13, 2014

(54) SURGE PROTECTION (75) Inventors: Arne Andersson, Ljusterö (SE);
Sten-Magnus Jonasson, Järfälla (SE);
Mikael Strandljung, Farsta (SE)

(73) Assignee: Telefonaktiebolaget L M Ericsson, Stockholm (SE)

( * ) Notice: Subject to any disclaimer, the term of this patent is extended or adjusted under 35 U.S.C. 154(b) by 0 days.

(21) Appl. No.: 13/580,084

(22) PCT Filed: Oct. 8, 2010

(86) PCT No.: PCT/SE2010/051090
§ 371 (c)(1),
(2), (4) Date: Aug. 20, 2012

(87) PCT Pub. No.: WO2011/112130
PCT Pub. Date: Sep. 15, 2011

(65) Prior Publication Data
US 2012/0327547 A1 Dec. 27, 2012

Related U.S. Application Data (60) Provisional application No. 61/311,859, filed on Mar. 9, 2010.

(51) Int. Cl.
*H02H 3/08* (2006.01)
*H02H 9/02* (2006.01)
*H02H 3/20* (2006.01)
*H02H 9/04* (2006.01)

(52) U.S. Cl.
USPC .......................... 361/93.1; 361/91.1; 361/111

(58) Field of Classification Search
USPC ....................................................... 361/93.1
See application file for complete search history.

(56) References Cited

U.S. PATENT DOCUMENTS

| 8,035,938 B2 * | 10/2011 | Divan ............................. 361/58 |
| 2007/0127182 A1 | 6/2007 | Chang et al. |
| 2008/0002325 A1 | 1/2008 | Kato et al. |
| 2009/0097181 A1 * | 4/2009 | Tamegai ...................... 361/91.5 |

FOREIGN PATENT DOCUMENTS

| DE | 19637435 A1 | 4/1998 |
| DE | 10118743 A1 | 10/2002 |
| WO | 9843334 A1 | 10/1998 |
| WO | 0013279 A1 | 3/2000 |

* cited by examiner

*Primary Examiner* — Dharti Patel
(74) *Attorney, Agent, or Firm* — Murphy, Bilak & Homiller, PLLC (57) ABSTRACT

An electronic fuse (506, 507) suitable for use in a direct current, DC, applications which is exposed to surges. The electronic fuse (506,507) comprises a current sensor (500) for measuring a current flowing in a current path of the DC system, the electronic fuse comprising a first transistor switch (501) which is arranged in the current path, the first transistor switch comprising at least one parasitic diode (511) having a forward direction which is opposite to an operational DC direction of the current path. The electronic fuse further comprising a controller (502) operatively connected to the current sensor (500) and adapted to control the first transistor switch (501) based on the measured current, and a current restrictor (503,520) which is capable of blocking a current from flowing in the current path in a direction opposite to the operational DC direction.

13 Claims, 7 Drawing Sheets

SURGE PROTECTION

TECHNICAL FIELD

The present invention relates generally to protection of electronic devices.

BACKGROUND

Electronic fuses (e-fuses) are being introduced in DC (Direct Current) power distribution systems for use with various electronic devices. For example, in new RBS (Radio Base Station) models, e-fuses are starting to replace traditional hydraulic-magnetic circuit breakers or fuses. E-fuses allow integration of more functionality and flexibility in the power distribution systems.

Figure 1:
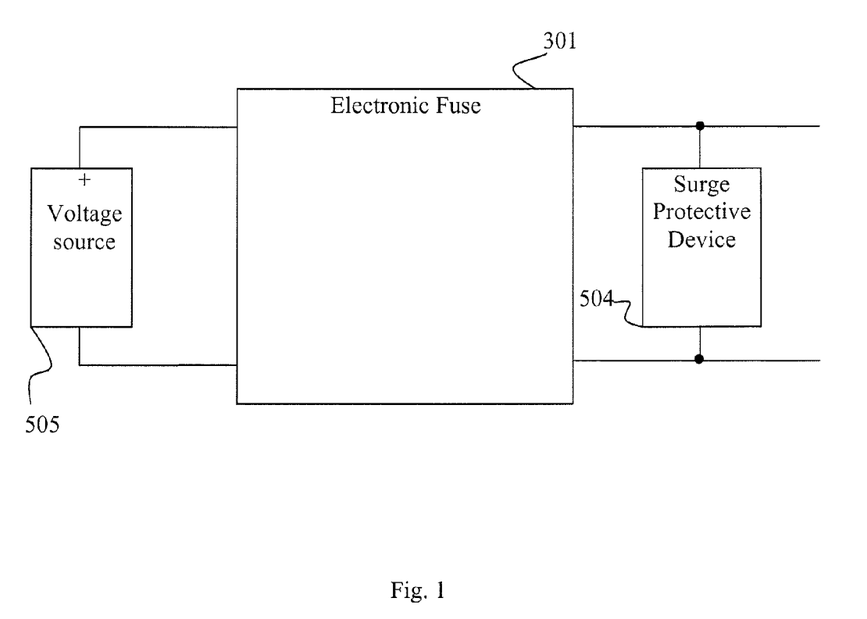
FIG. 1 is a block diagram illustrating an arrangement comprising a voltage source connected to a surge protective device via an electronic fuse, according to the state of the art.

A simplified DC system, according to the prior art, comprising a voltage source 505, connected to a surge protective device (SPD) 504 via an e-fuse 301 is shown in FIG. 1. An e-fuse 301 is normally used in conjunction with an SPD 504 when DC-power is supplied from a voltage source 505 to an electronic device (not shown) when exposed to surges on the distribution wiring. The described e-fuse 301 is designed for DC applications and comprises therefore a current path with a predetermined operational DC direction. In the example illustrated in FIG. 1, the operational DC direction corresponds to a clockwise current flow.

Figure 2:
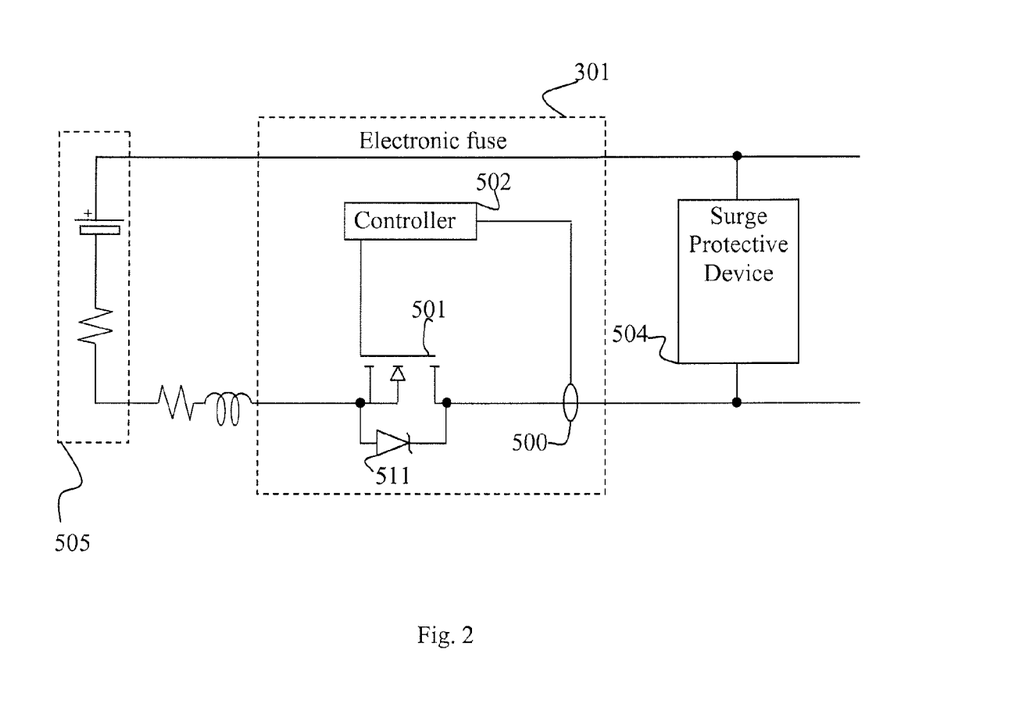
FIG. 2 is a block diagram illustrating of the electronic fuse of FIG. 1 in more detail.

The e-fuse of FIG. 1 may be configured according to the simplified scheme of FIG. 2, where the e-fuse 301 comprises a current sensor 500 which is adapted to measure an electric current flowing in the current path. A transistor switch 501 is also located in the current path of the e-fuse 301. In the state of the art e-fuse 301 design, the transistor switch 501 is usually a unidirectional switch based on an N-channel FET transistor. This component typically has a parasitic diode 511 which can be inherent to the semi-conductor device. The parasitic diode 511 is anti-parallel, i.e. its forward direction is opposite to the operational DC direction of the e-fuse 301. The e-fuse 301 as illustrated in FIG. 2 further comprises a controller 502 which is operatively connected to the current sensor 500 and the transistor switch 501. The controller 502 controls the transistor switch 501 based on the measured current. If the measured current is an over current, i.e. a current that exceeds a threshold current, which may be referred to as a security threshold, then the controller is adapted to open the transistor switch 501 in order to interrupt the current flow in the current path of the e-fuse 301.

In many applications, electronic equipment may be subject to sudden current surges, typically caused by lightning. State of the art e-fuses 301 often fail due to incapacity of interrupting a sudden current surge. When feeding electronic equipment exposed to lightning threats, the power distribution and e-fuses 301 must be protected by one or several SPDs 504. The e-fuse 301 should be able to disrupt the surge current and divert the energy to an external SPD 504 and to restore normal operation once the surge condition has disappeared. If the e-fuse 301 fails to disrupt a surge current to an external SPD 504 the e-fuse and the electronic equipment may be exposed currents which may be magnitudes larger than the load current. Consequently, the e-fuse 301 and/or the electronic equipment may in some situations be partly or completely out of service and a repair visit will be necessary.

SUMMARY

It is an object of the invention to address at least some of the limitations, problems and issues outlined above. It is also an object to improve the robustness of an electronic fuse. It is possible to achieve these objects and others by using a method and an arrangement as defined in the attached independent claims.

According to one aspect, an electronic fuse is provided, which comprises a current sensor for measuring a current flowing in a current path. The electronic fuse comprises a first transistor switch which is arranged in the current path, the first transistor switch comprising at least one parasitic diode having a forward direction which is opposite to an operational DC direction of the current path. The electronic fuse further comprises a controller operatively connected to the current sensor and adapted to control the first transistor switch based on the measured current. The electronic fuse further comprises a current restrictor which is capable of blocking a current from flowing in the current path in a direction opposite to the operational DC direction.

This solution provides a unidirectional e-fuse being capable of blocking externally generated surge currents having a polarity which is opposite to the operational DC direction, and may therefore be used for avoiding hardware failure, mission critical equipment down time and service visits at site.

The above arrangement may be configured and implemented according to different optional embodiments. In one exemplary embodiment, the current restrictor comprises a semi-conductor diode having a forward direction which is coinciding to the operational DC direction.

In another exemplary embodiment the e-fuse further comprises a timer and that the controller further comprises a re-connector. The controller is configured to start the timer when the first transistor switch is opened by the controller and to automatically reclose the first transistor when a delay time of the timer has elapsed.

According to one possible embodiment, the current restrictor comprises a second transistor switch arranged in the current path in series with the first transistor switch, the second transistor switch comprising at least one parasitic diode having a forward direction which is coinciding to the operational DC direction, and wherein the controller is further operatively connected to the second transistor switch and adapted to open the second transistor switch if a current above a threshold value is measured by the current sensor.

In another exemplary embodiment, the electronic fuse further comprises a timer and the controller further comprising a re-connector, wherein the controller is further configured to start the timer when the first and/or second transistor switch is opened via the re-connector and to automatically reclose the opened transistor switch/es when a delay of the controller has elapsed.

If traditional hydraulic-magnetic circuit breakers (CBs) or fuses are replaced by the invention, the need for resetting CBs and/or replacing fuses by operator intervention after a surge event can be reduced.

According to another aspect, a method of manufacturing an e-fuse is provided. The method comprises providing a current sensor which is capable of measuring a current of a current path of the direct current system. The method further comprises providing a first transistor switch having an parasitic diode with a forward direction which is opposite to an operational DC direction of the current path The method further comprises providing a current restrictor which is capable of blocking a current from flowing in the current path if the current is of an opposite direction to the operational DC direction and providing a controller such that it is operatively connected to the current sensor and to the transistor switch and arranged such that it can open the first transistor switch if the current sensor has measured a current above a threshold value.

By manufacturing an e-fuse according to this method, a more robust e-fuse may be achieved by enabling the e-fuse to restrict currents flowing, regardless of the polarity of the current. Instead of breaking down, the manufactured e-fuse may have the capability of withstanding surge currents having a polarity which is opposite to the operational DC direction is flowing through the electronic fuse.

The above method may be configured and implemented according to different optional embodiments. According to one example embodiment, the method further comprises providing as the current restrictor, a semi-conductor diode having a forward direction coinciding to the operational DC direction.

According to another exemplary embodiment, the method further comprises providing a timer such that it is operatively connected to the controller, wherein the controller is provided with a re-connector having a re-connection function, and wherein the controller is further configured to start the timer when the first transistor switch is opened by the controller and to automatically reclose the opened transistor switch when a delay of the controller has elapsed.

According to another exemplary embodiment, the method further comprises providing as the current restrictor, a second transistor switch having a parasitic diode with a forward direction coinciding with the operational DC direction. The method further comprises to provide the controller such that it is operatively connected to the second transistor switch and such that it is adapted to open the second transistor switch if a current is measured above a threshold value.

A According to another exemplary embodiment, the method further comprises providing a timer such that it is operatively connected to the controller, wherein the controller is provided with a re-connector having a re-connection function, and wherein the controller is further configured to start the timer when the first and/or second transistor switch is opened by the controller and to automatically reclose the opened transistor switch/es when a delay of the controller has elapsed.

Further details and features of the suggested arrangement and the associated method of manufacturing, as well as its benefits, will be explained in further detail in the detailed description following below.

BRIEF DESCRIPTION OF DRAWINGS

The invention will now be described in more detail by means of exemplary embodiments and with reference to the accompanying drawings, in which.

DETAILED DESCRIPTION

In the following, a detailed description of an electronic fuse, hereinafter denoted e-fuse, is disclosed. The suggested e-fuse is capable of blocking or interrupting surges, such as e.g. lighting surges, which are flowing in the opposite direction to an e-fuse predetermined operational DC direction.

Figure 3:
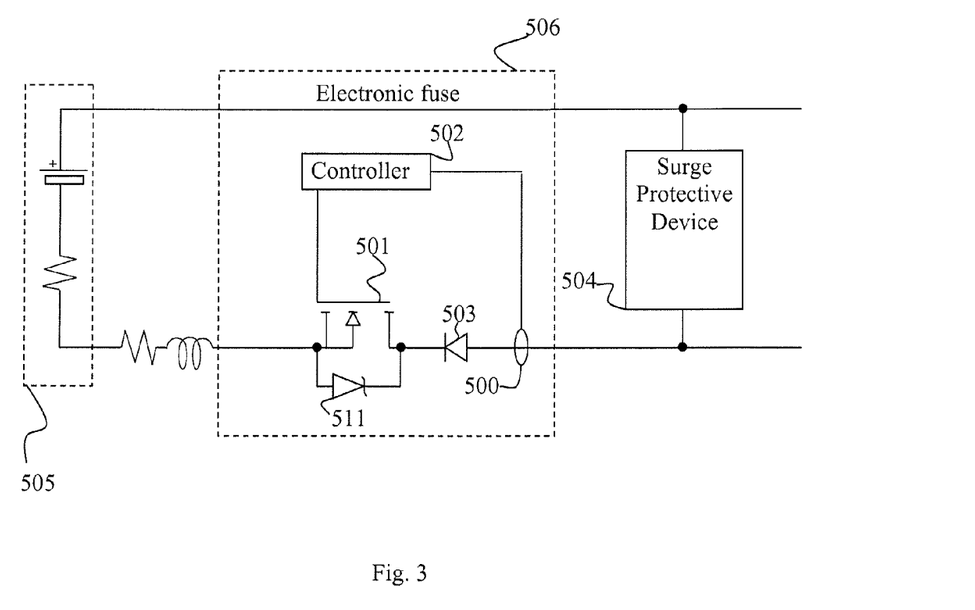
FIG. 3 is a block diagram illustrating a first embodiment of an electronic fuse.

Now with reference to FIG. 3 is a schematic illustration of a block diagram showing one embodiment of an e-fuse 506. The e-fuse 506 of FIG. 3 is for use in a DC application and configured such that it is suitable to block surges flowing in a direction opposite to the operational DC direction. In this particular example the operational DC direction corresponds to a clockwise current flow.

The e-fuse 506 comprises a current sensor 500 which is capable of measuring a current flowing in a current path through the e-fuse 506. The e-fuse 506 further comprises a first transistor switch 501, typically a MOSFET switch, which is located in the current path. In FIG. 3 the first transistor switch 501 is arranged subsequently to the current sensor 500 with regard to the operational DC direction. However, the first transistor switch 501 may alternatively be arranged at another location in relation to the current sensor 500 where the location enables a current flowing in the current path to be measured. Various arrangements will become apparent to the person skilled in the art.

The first transistor switch 501 comprises a parasitic diode 511 which may be inherent in semi-conductor devices, such as the transistor switch mentioned above. The parasitic diode 511 is anti-parallel to the operational DC direction, i.e. the forward direction of the parasitic diode 511 is opposite to the operational DC direction.

The e-fuse 506 further comprises a controller 502 which is operatively connected to the current sensor 500 and adapted to control the first transistor switch 501 based on the measured current. If the measured current is considered to be an over current, i.e. a current that exceeds a threshold value, typically referred to as a security threshold which may typically be a predetermined threshold, the controller 502 is adapted to open the transistor switch 501 in order to interrupt the surge current flowing in the current path and through the e-fuse 506.

The person skilled in the art will appreciate that the controller 502 may be implemented using standard circuit technologies, which exist in profusion. For example, the controller 502 can be implemented using discrete electronic components, using an integrated circuit, using programmable circuitry or using any combination thereof. The controller 502 may also be implemented using one or more processors programmed with suitable software.

One effect of the parasitic diode 511 is that the transistor switch is incapable of restricting some surge currents flowing in the current path and opposite to the operational DC direction. A surge current flowing in the current path in an opposite direction to the operational DC direction could cause damage to the e-fuse 506 and/or the voltage source 505, since, due to the parasitic diode 511, the first transistor switch 501 may not be able to interrupt such a surge current.

In order to prevent a surge current to flow through the transistor switch the e-fuse 506 further comprises a current restrictor 503 which allows current to flow in the operational DC direction but which is capable of blocking a current from flowing in the current path in a direction opposite to the operational DC direction. Thus, if a surge current is flowing in a direction opposite to the operational DC direction the current restrictor 503 is configured to divert the current to a Surge Protective Device (SPD) 504, thereby prohibiting the current from causing any damage to the e-fuse 506 and/or the voltage source 505. The current restrictor 503 is not required to block the current in the opposite direction of the operational DC direction all the time, but it should at least be possible to put the current restrictor 503 in a state where it blocks the current in the opposite direction of the operational DC direction. According to one embodiment, the current restrictor 503 is provided as a semiconductor diode, or any another component having corresponding properties and/or functionality. If a surge current is flowing in the current path but in a coinciding direction to the operational DC direction, then the controller 502 is capable of restricting the surge current by opening the first transistor 501 switch which diverts the surge current to the SPD 504.

By comparing this solution to the e-fuses available in the state of the art, this arrangement may reduce the risk of damaging the voltage source 505 and/or the e-fuse 506. The e-fuse 506, may according to some embodiments, typically be designed to withstand the sum of the voltage source 505 and any residual voltage which may be present during or after a surge has been diverted to the SPD 504. This may in some embodiments, according to the application, require the components of the e-fuse to be of a predefined dimension.

In another optional embodiment the e-fuse 506 is also provided with a timer (not shown) while the controller 502 is also further provided with a re-connector. The re-connector is capable of re-connecting a switch, such as the switch 501 of FIG. 3. The timer is operatively connected to the controller 502, and the controller 502 is adapted to start the timer when the first transistor switch 501 is opened and to automatically re-close the first transistor switch when the delay time has elapsed. The delay time can be adapted to different application requirements.

In one embodiment the timer may be external to the controller 502. Alternatively, the timer may be embodied within the controller 502. The re-connector can be implemented in hardware, software or by means of a microcontroller.

If the cause of the opening of the transistor switch 501 was a temporary surge event, operation of the equipment will be restored. If, however the cause of opening of the e-fuse 506 was instead a permanent over current or short circuit condition, it will re-open and isolate the faulty circuit. The re-connector can be implemented according to several different timing schemes which may depend on the application. The number of re-closure attempts and timing between consecutive re-closings may be adapted to different requirements.

Figure 4:
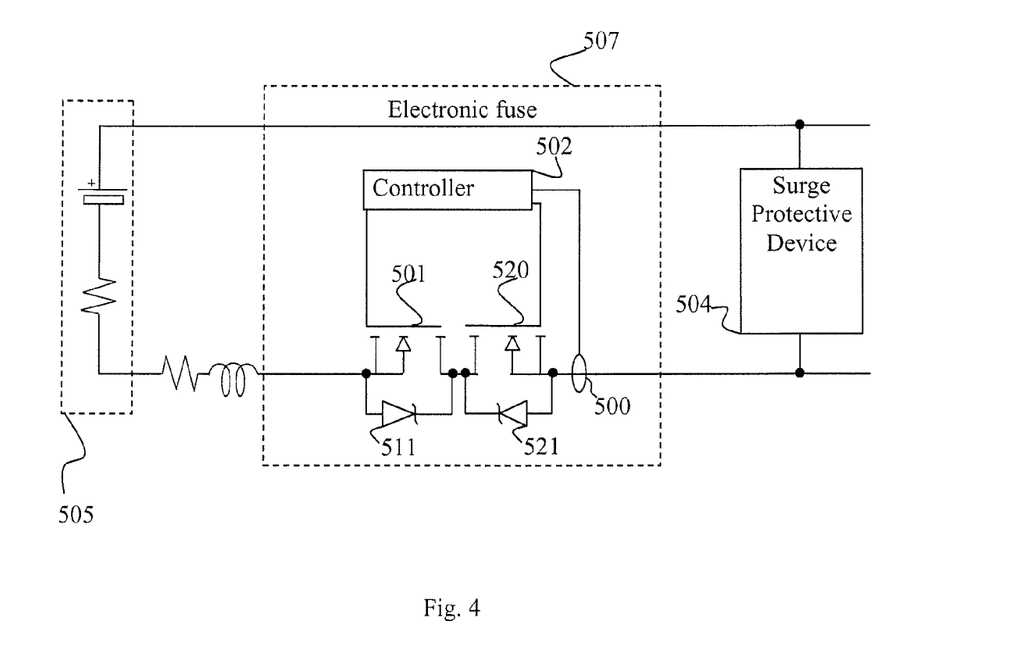
FIG. 4 is a block diagram illustrating a second embodiment of an electronic fuse comprising two transistor switches.

FIG. 4 is a schematic illustration of another optional embodiment of the e-fuse 507. The current restrictor is, in this embodiment, provided by a second transistor switch 520 arranged in series with the first transistor switch 501 but in the opposite direction to the first transistor switch 501. In resemblance to the first transistor switch, also the second transistor switch 520 is typically a MOSFET switch. The second transistor switch 520, comprises an parasitic diode 521 having a forward direction which is coinciding with the operational DC direction and therefore also having a forward direction which is opposite to the forward direction of the first transistor switch's parasitic diode 511. According to the arrangement in this embodiment the first transistor switch 501 and the second transistor switch 520 together forms a bidirectional switch.

The controller 502, according to this embodiment, is further operatively connected to the second transistor switch 520. The first transistor switch 501 and the second transistor switch 520 are independently or collectively controllable by controller 502 based on a current measured by the current sensor 500. If the measured current is above a threshold value, which may be predefined, the controller 502 opens the first or the second transistor switch 520 depending on the polarity of the surge current. In one embodiment, the first transistor switch 501 is opened if a surge current which flows in a coinciding direction to the operational DC direction, is detected resulting in that the surge is diverted to the SPD. In another embodiment, both of the first transistor switch 501 and the second transistor switch 521 is opened regardless of the polarity of the surge current.

If a surge current is flowing in the opposite direction of the operational DC direction and the current sensor 500 is measuring a current above the threshold value, the controller 502 is configured to open the second transistor switch 520 and also optionally the first transistor switch 501. The surge current is thus interrupted by the bidirectional switch and thereby enabling the e-fuse 507 to divert the surge current to the SPD 504.

The embodiment which is described above and illustrated in FIG. 4 enables a more robust and bi-directional switch. Transistor switches may have lower resistance compared to other current restrictors. Moreover, a solution to the problem comprising two transistor switches enables the option of only opening one of the two transistor switches depending on the polarity of the surge.

In another optional embodiment, the e-fuse 507 comprises also a timer (not shown) and the controller 502 comprises a re-connector for reconnecting any one of the first transistor switch 501 and the second transistor switch 520. The controller 502 is configured to start the timer when the first transistor switch 501 and/or second transistor switch 520 is opened and to automatically reclose the first transistor switch 501 and/or second transistor switch 502 when the delay time of the timer has elapsed. In order to successfully re-connect the e-fuse 506, both of the first transistor switch 501 and the second transistor switch have to be closed and also remain closed. In one embodiment the timer may be arranged external to the controller 502. Alternatively, the timer may be embodied within the controller 502.

Also the re-connector as described in the embodiment above can be implemented in hardware, software or by means of a microcontroller. If the cause of the opening of the first transistor switch 501 and/or the second transistor switch 520 was a temporary surge event, operation of the equipment will be restored. If the cause of opening of the e-fuse 507 was a permanent over current or short circuit condition, it will re-open and isolate the faulty circuit. The re-connector can be implemented according to several different timing schemes which may depend on the application. The number of re-closure attempts and timing between consecutive re-closings may be adapted to different requirements. The above described solution may decrease the need for manual intervention in order to restore the functionality of the e-fuse.

The embodiments illustrated in FIGS. 5 to 7 will now be described in detail. The manufacturing methods described with reference to FIGS. 5 to 7 may be used to manufacture the e-fuse according to the embodiments of FIGS. 3 and 4.

Figure 5:
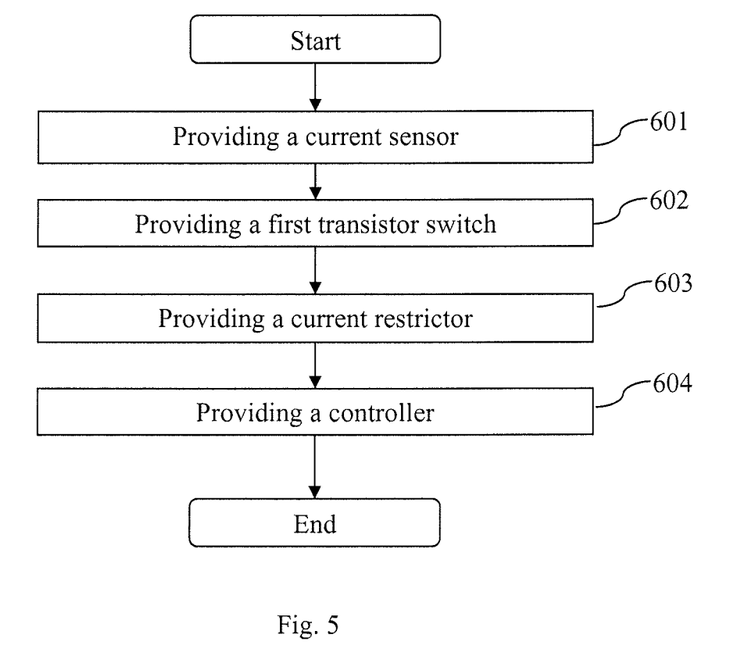
FIG. 5 is a flowchart illustrating a manufacturing method of an electronic fuse.

FIG. 5 is a flow chart describing a method of manufacturing an e-fuse according to any of the embodiments described in FIG. 3 or 4. The method comprises an action of providing 601 a current sensor which is capable of measuring the current of a current path which, during operation, is flowing in an operational DC direction. In another action a first transistor switch, typically a MOSFET switch, is provided 602. As already mentioned above, semi-conductors, such as e.g. MOSFET switches, have an parasitic diode with a forward direction which is opposite to the operational DC direction when installed into an electronic arrangement. In the event of a surge current flowing in the current path in the direction opposite to the operational DC direction in such an electronic arrangement, the first transistor switch will not restrict the current and the e-fuse will be exploited to the risk of damage.

In order to protect the e-fuse and/or the voltage source from surges flowing through the current path in a direction opposite to the operational DC direction a current restrictor capable of blocking such current is provided 603. Thus, enabling a more robust e-fuse which is protected from surges flowing in the opposite direction to the operational DC direction and which instead diverts the surge current to an SPD which is connected to the e-fuse. The person skilled in the art will readily understand how to arrange an SPD in relation to the e-fuse in order to get the sought effect. However, in one typical embodiment, the SPD is connected between the e-fuse and the exploited part of the DC system.

In another action, a controller is provided 604 which is operatively connected to the sensor and the first transistor switch. The controller is arranged such that, during operation, it is capable of opening the first transistor switch and consequently to disconnect the current path when an over current, short circuit or a surge current is detected by the sensor. Thus, the controller is capable of opening the first transistor switch if the sensor detects a surge current flowing in a current path in the operational DC direction. It is to be understood the actions of the method for manufacturing an e-fuse illustrated in FIG. 5, as well as in the following FIGS. 6 to 7, can be performed in any mutual order.

Figure 6:
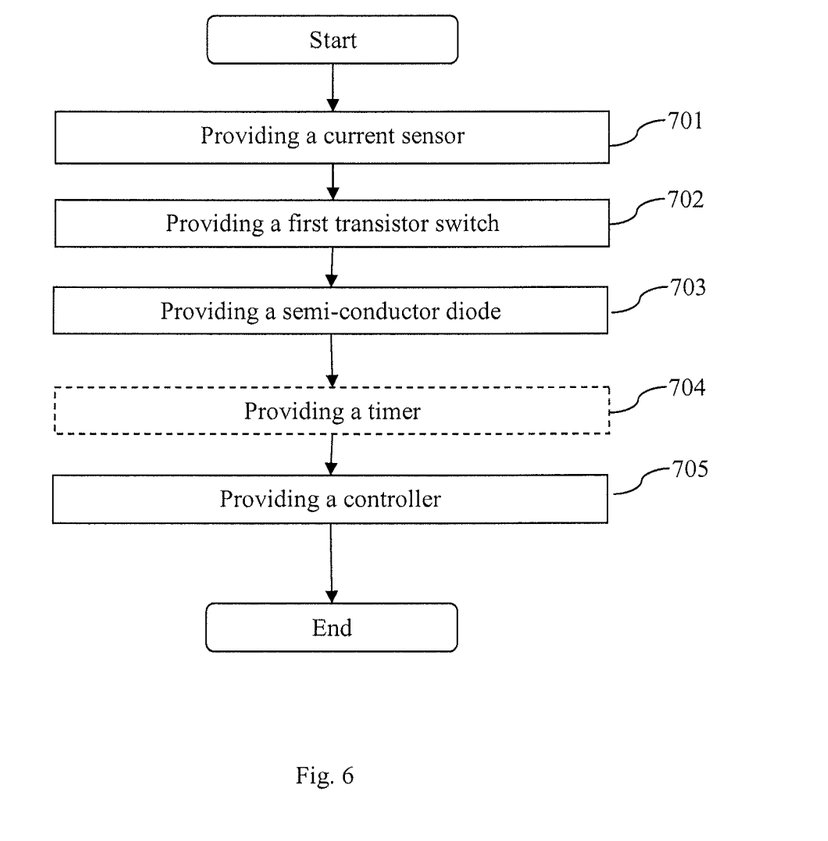
FIG. 6 is a flowchart illustrating a manufacturing method according to one embodiment.

FIG. 6 shows a flow chart describing an optional embodiment of a method of manufacturing an e-fuse. In addition to the method described in FIG. 5 the method of FIG. 6 further comprises the action of providing 704 a timer to the e-fuse. FIG. 6 further illustrates the action of providing 703 a current restrictor as a semi-conductor diode, or another component having the corresponding properties, with a forward direction which is coinciding with an operational DC direction of the e-fuse. If a timer is applied, a controller comprising a re-connector arrangement is provided in action 705, such that the timer is operatively connected to the controller. The controller is provided such that it is further capable of starting the timer when the first transistor switch is opened by the controller and such that it can automatically reclose the opened transistor switch when the delay has elapsed.

Figure 7:
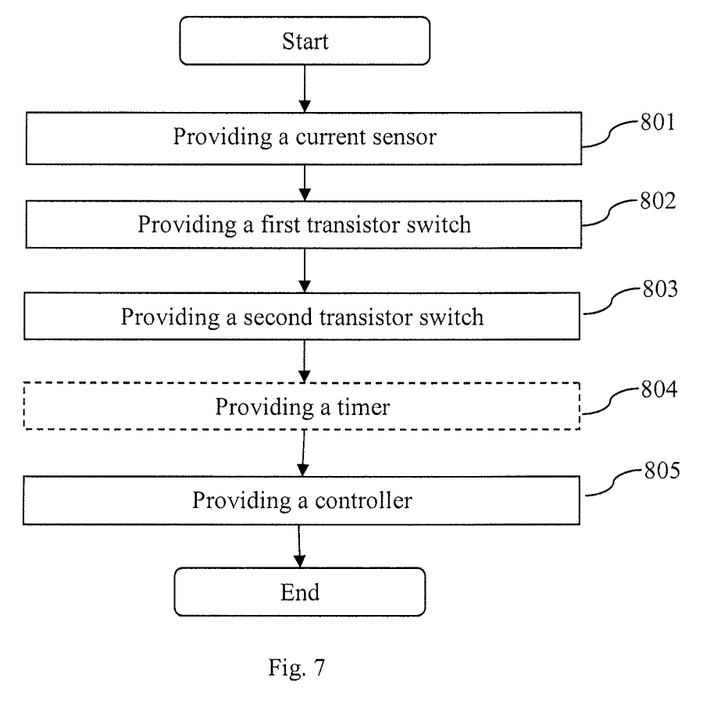
FIG. 7 is a flowchart illustrating another embodiment of manufacturing method according to another embodiment.

FIG. 7 is another flow chart describing the actions of an optional embodiment of a method of manufacturing an e-fuse. In addition to the first two actions according to the method as described in FIG. 5, the method as described in FIG. 7 comprises an optional action of providing 804 a timer to the e-fuse. The timer is provided to be arranged to be operatively connected to a controller. The method further comprises the action of providing 803 as a current restrictor a second transistor switch, which is typically also a MOSFET switch. The second transistor switch is provided with a parasitic diode having a forward direction which coincides with the operational DC direction of the electric fuse. The second transistor switch is provided to be arranged in series with the first transistor switch but having an opposite direction.

The method further comprises an action 805 of providing a controller which comprises a re-connector if a timer is applied. The controller is provided to be capable of starting the timer when the first transistor switch or the second transistor switch is opened by the controller and to automatically reclose the opened transistor switch/es when the delay has elapsed.

There are several advantages associated with the embodiments shown in FIGS. 3 and 4. There are also corresponding advantages associated with manufacturing an e-fuse according to the described method with reference to FIGS. 5 to 7. The embodiments solve the problem with latching e-fuses when exposed to surge currents with positive polarity, having to be reset by operator intervention. The embodiments may provide a solution to the problem of associated with unidirectional e-fuses being incapable of interrupting externally generated surge currents with a direction which is of negative polarity, i.e. flowing in a direction which is opposite to the operation DC direction. Such surge currents with negative polarity are normally causing hardware failure, mission critical equipment down time and service visits at site. If traditional hydraulic-magnetic circuit breakers or fuses are replaced by the embodiments described above the problem of resetting/replacing fuses or circuit breakers by operator intervention after a surge event can be reduced or eliminated. According to one example, the e-fuse which is described above with reference to FIGS. 3 and 4 can be used in conjunction to a Radio Base Station.

Modifications and other embodiments of the disclosed e-fuse will come to mind to one skilled in the art having the benefit of the teachings presented in the foregoing descriptions and the associated drawings. Therefore, it is to be understood that the e-fuse is not to be limited to the specific embodiments disclosed and that modifications and other embodiments are intended to be included within the scope of this disclosure. Although specific terms may be employed herein, they are used in a generic and descriptive sense only and not for purposes of limitation.

ABBREVIATIONS

CB—Circuit Breaker
DC—Direct Current
E-fuse—Electronic Fuse
FET—Field-effect transistor
MOSFET—metal-oxide-semiconductor field-effect transistor
SPD—Surge Protective Device
RBS—Radio Base Station

The invention claimed is:

1. An electronic fuse comprising:
   a current sensor configured to measure a current flowing in a current path of the electronic fuse;
   a first transistor switch arranged in the current path and including at least one parasitic diode having a forward direction which is opposite to an operational direct current (DC) direction of the current path;
   a controller operatively connected to the current sensor and configured to control the first transistor switch based on the measured current;
   a current restrictor configured to block current from flowing in the current path in a direction opposite to the operational DC direction;
   wherein the current sensor is arranged before the current restrictor in the current path, relative to the operational DC direction; and
   wherein the electronic fuse is configured for connection to a surge protective device.

2. The electronic fuse of claim 1, wherein the current restrictor comprises a semi-conductor diode having a forward direction that coincides with the operational DC direction.

3. The electronic fuse of claim 1, further comprising a timer, and wherein the controller further comprises a re-connector and is configured to start the timer when the first transistor switch is opened by said controller and to automatically reclose the first transistor switch using the re-connector, when a delay time of the timer has elapsed.

4. The electronic fuse of claim 1, wherein the current restrictor comprises a second transistor switch arranged in the current path in series with the first transistor switch, said second transistor switch including at least one parasitic diode having a forward direction that coincides with the operational DC direction, and wherein the controller is further operatively connected to said second transistor switch and configured to open the second transistor switch if a current, as measured by the current sensor, is above a threshold value.

5. The electronic fuse of claim 4, further comprising a timer, and wherein the controller further comprises a re-connector and is configured to start the timer when one or both of the first and second transistor switches are opened via said re-connector, and to automatically reclose any opened transistor switches using the re-connector, when a delay of the timer has elapsed.

6. A method of manufacturing an electronic fuse that is configured for connection to a surge protective device, the method comprising:
    providing a current sensor configured to measure a current in a current path of the electronic fuse;
    providing a first transistor switch including a parasitic diode having a forward direction opposite to an operational direct current (DC) direction;
    providing a current restrictor configured to block current from flowing in the current path opposite to the operational DC direction;
    providing a controller that it is operatively connected to the current sensor and to the first transistor switch, and configured to open the first transistor switch if the current sensor measures a current above a threshold value; and
    wherein the current sensor is arranged before the current restrictor in the current path relative to the operational DC direction.

7. The method of claim 6, further comprising providing as said current restrictor, a semi-conductor diode having a forward direction coinciding with the operational DC direction.

8. The method of claim 6, further comprising providing a timer that it is operatively connected to the controller, and wherein providing said controller comprises providing a controller that is configured to start the timer when the first transistor switch is opened by the controller and to automatically reclose the first transistor switch when a delay of the timer has elapsed.

9. The method of claim 6, further comprising providing as said current restrictor, a second transistor switch having a parasitic diode which has a forward direction that coincides with the operational DC direction, and wherein providing said controller comprises providing a controller that is operatively connected to said second transistor switch and configured to open said second transistor switch, if a current measured by the current sensor is above a threshold value.

10. The method of claim 9 further comprising providing a timer such that it is operatively connected to the controller, and wherein providing said controller comprises providing a controller that includes a re-connector arrangement and is further configured to start the timer when one or both of the first and/or second transistor switches is opened by the controller and to automatically reclose any opened transistor switches when a delay of the timer has elapsed.

11. A method of providing electronic fuse protection comprising:
    restricting current flow in a current path to be protected, to an operational Direct Current (DC) direction, so that the current path is unidirectional in the operational DC direction, and so that externally generated surge currents having a polarity that is opposite to the operational DC direction are diverted to an external surge protective device;
    measuring current flowing in the current path;
    opening a first transistor switch that is arranged in the current path, in response to determining that the measured current exceeds a threshold value.

12. The method of claim 11, further comprising closing the first transistor automatically after lapse of a delay time from said opening of the first transistor switch.

13. The method of claim 11, further comprising restricting the current flow in the current path via a second transistor switch that includes a parasitic diode having a forward direction coinciding with the operational DC direction, and opening the second transistor switch responsive to determining that the measured current exceeds a threshold value.

* * * * *

UNITED STATES PATENT AND TRADEMARK OFFICE
CERTIFICATE OF CORRECTION

PATENT NO. : 8,724,280 B2
APPLICATION NO. : 13/580084
DATED : May 13, 2014
INVENTOR(S) : Andersson et al.

It is certified that error appears in the above-identified patent and that said Letters Patent is hereby corrected as shown below:

On the title page, item (75), under "Inventors", in Column 1, Line 2, delete "Järfallä" and insert -- Järfälla --, therefor.

In the Specification

In Column 6, Line 11, delete "switch 521" and insert -- switch 520 --, therefor.

In Column 6, Line 35, delete "switch 502" and insert -- switch 520 --, therefor.

Signed and Sealed this
Thirty-first Day of March, 2015

Michelle K. Lee
*Director of the United States Patent and Trademark Office*